Patented Dec. 8, 1936

2,063,869

UNITED STATES PATENT OFFICE 2,063,869

SICCATIVE COMPOSITION AND PROCESS OF MAKING SAME

Carleton Ellis, Montclair, N. J., assignor to Ellis-Foster Company, a corporation of New Jersey No Drawing. Application March 23, 1932,
Serial No. 600,833

19 Claims. (Cl. 134—26)

This invention relates to resinous coating binders of derivation as is subsequently disclosed and further relates to resinous coating binders which are soluble in aqueous alkaline solutions and which when dissolved in water containing a volatile alkali such as ammonium hydroxide may be applied, with or without pigment, to surfaces as a varnish, paint, lacquer, enamel, mastic, and the like, and on evaporation of the ammonia and the water leave a firm coating.

The present invention is particularly concerned with coatings containing chemically altered glyceride oils and/or their fatty acids or a constituent fatty acid particularly unsaturated fatty acids of glycerides, hence containing twelve or more carbon atoms in the acid molecule; specifically tung oil and/or its fatty acids altered to secure different characteristics by reaction with a compound preferably containing the group —CO—CH= or similar or analogous reactive group or body generating same, including the quinones, such as benzoquinone and naphthoquinone, aldehydes such as acrolein and crotonaldehyde, likewise their corresponding acids, maleic and fumaric acids and anhydrides, itaconic and citraconic acids, maleinanilic acid, cinnamic acid, and the like. Such compounds are hereinafter referred to as diene reaction products, and where acids or acid anhydrides are employed in producing such diene reaction product they are more specifically identified as acid modified derivatives.

The present invention is a continuation in part of the following applications. In application, Serial No. 549,334, filed July 7, 1931, entitled "Ellisol and process of making same", there is more particularly described and claimed these diene reaction products, particularly illustrated by the maleic acid reaction products of tung oil, and their salts, particularly their ammonium salts, and coatings containing the same.

In application, Serial No. 555,868, filed August 7, 1931, for "Reaction products and method of preparing same", there is more particularly described and claimed these diene reaction products obtained as described above from various glyceride oils and/or their fatty acids by reaction with compounds containing the group —CO—CH= or similar or analogous reactive group or body containing same, as illustrated by the maleic acid reaction products with tung oil acids, etc., as well as compositions for coatings containing the same.

In application, Serial No. 577,403, filed November 25, 1931, entitled "Products of diene synthesis and process of making same", there is more particularly described and claimed these diene reaction products, and more particularly the natural resin diene reaction products, such as rosin maleic acid, tung oil rosin maleic acid, tung oil acid rosin maleic acid, and similar reaction products, as well as varnish type compositions containing the same.

In application, Serial No. 581,077, filed December 14, 1931, entitled "Ellisol paint and varnish and process of making same", there is more particularly described and claimed the diene reaction products of the type of natural resin acid-modified ingredients, such as rosin maleic acid, particularly in the form of their salts, such as ammonium salts, and particularly in solutions, as well as articles of manufacture carrying such coatings. In the instant application, there is more particularly described and claimed compositions particularly adapted for coating purposes involving combinations of the diene-modified ingredients to produce compositions of relatively low viscosity, substantially free from soapiness, and having a high degree of brushability enabling their utilization for coating purposes particularly.

Rosin maleic acid or analogous compound is a preferred ingredient of the product embraced under the present invention. This may be prepared for example, merely by heating rosin or abietic acid with maleic acid or anhydride or analogous acid such as fumaric acid, whereupon reaction takes place and the rosin becomes increased in acidity thereby.

A second desirable ingredient is a drying oil, preferably of an acid character such as tung maleic acid. The tung maleic acid ingredient may be prepared, for example, by heating tung oil with maleic acid, for example, in proportions of 100 to 40 parts respectively by weight, at temperatures between 135° C. and the boiling point of the maleic acid, the addition of the maleic acid to the tung oil during the heating operation preferably being gradual until combination is secured. In some cases when a siccative oil component is desired the tung maleic acid material may be replaced by polymerized oil such as may be prepared by heating tung oil and tung acids together. For example, reference is made to the preparation of resins in which a mixture of a drying oil and a drying oil fatty acid are heated together under polymerizing conditions.

Thus a mixture of equal parts tung oil and tung acids or 40 parts of the oil and 60 parts of the acids is heated for a period of 10 to 20 minutes at 260–280° C. When so treated the acid tung material which results through polymerization no longer reacts very freely with maleic acid, in fact only a relatively small proportion as a rule of the maleic compound being capable of entering into combination.

On the other hand ordinary rosin is heated with maleic acid to a temperature of perhaps 250–270° C. to react presumably according to the diene synthesis, a proportion of for example 100 parts rosin to 30 parts maleic acid by weight being used.

Tung maleic acid, especially when 25 to 30 per cent of maleic acid has been combined therein, is quite readily soluble in aqueous ammonium hydroxide, that is in ordinary ammonia water or dilute aqueous solutions of ammonia gas, the solution even in fairly high concentration not giving an undue viscosity. These solutions may be mixed with equal concentrated solutions of rosin maleic acid dissolved in ammonia water and the two ingredients, namely the siccative oil and the resin, will provide a water-varnish of useful properties which, if desired, may have added to it pigments which are compatible, such as lithopone, to make a paint composition.

On the other hand, if the polymerized product of tung oil acids is treated with ammonia, heavy viscous turbid solutions are quite likely to result which do not have the proper consistency for coating purposes, neither do they permit ready application by brushing. The addition of rosin maleic acid to such thick soapy solutions causes a very desirable change. The composition becomes much lower in viscosity, clarifies and the former turbid oil material or emulsion goes over into a clear liquid which can be brushed or sprayed as a coating composition.

A mixture of equal parts of the rosin maleic acid and of the polymerized tung oil material can be used advantageously being brought into solution as a water composition by the means of aqueous ammonia, likewise proportions may be varied over a considerable range, for example, 60 parts of the rosin maleic acid to 40 parts of the acid oil; likewise ratios of 40:60, 70:30, 30:70, etc., may be used.

A third type of composition involves the employment of rosin maleic acid, tung oil maleic acid and polymerized tung oil tung acids, these several ingredients being mixed in various proportions as desired and brought into aqueous solution by means of ammonia or other alkali.

Pigments, dyes, stains, wood flour (which forms an oatmeal finish), lithopone, and various other compatible pigments may be employed, likewise aluminum powder, and the like. Zinc oxide is likely to react with some of the components resulting in livering.

The compositions may be applied by spraying or brushing or in other ways to surfaces of wood, plaster, cement, steel, copper, brass, aluminum, and other metals.

The coating may be simply air dried or it may be baked. A plurality of coats may be employed on metals or other surfaces for example applying a primer of one character and using upper coats of a dissimilar nature. The employment of the water paint or varnish as a primer is possible followed by the application of a nitrocellulose or other cellulose ester or ether lacquer over such primer. Or in some cases the coatings may be reversed. Likewise ordinary varnishes may be applied over a priming coat of the water varnish or water paint.

There are also a considerable number of resins of fairly high acid number made from a polyhydric alcohol such as glycerol, a polybasic acid such as phthalic anhydride, and a modifying agent such as a monobasic acid, particularly one of the drying oil acids. These resins (Rezyls) likewise may be admixed with the components noted above to make a still more complex mixture of water paint or varnish.

Driers may be added as desired, including the Soligen driers made from naphthenic acids, etc.

*Example 1.*—25 parts rosin, 25 parts tung acids and 50 parts tung oil were heated to 280° C. and held at that temperature for 20 minutes. The product when cool was a clear viscous oil. On treatment with aqueous ammonia it formed a turbid emulsion-like solution which showed considerable soapiness. 50 parts of the oil were heated with 5 parts maleic acid. After this treatment a very small amount of unreacted insoluble material settled out of the oil. A 33 per cent solution in aqueous ammonia was made and was found to be clearer than that obtained from the unmaleinated material but was still somewhat turbid. The viscosity was lower. Coatings of both of these solutions were applied to surfaces and allowed to dry.

*Example 2.*—Equal weights of rosin, tung oil and tung acids were mixed and heated to 280° C. for 10 minutes. Portions of the product were then heated to 250° C. with 5, 10 and with 15 per cent of maleic acid and the maleinated products were treated with aqueous ammonia.

33 per cent solutions were prepared. That obtained from the product which had been treated with 5 per cent of maleic acid was very turbid, viscous and soapy. A solution applied as a coating dried overnight to give a clear but somewhat uneven film. The rosin tung oil tung acid product which had been treated with 10 per cent maleic acid also gave a turbid, viscous and somewhat soapy solution, less so, however, than that in which 5 per cent of maleic acid was used. The treatment with 15 per cent of maleic acid did not improve the brushability of the composition and in fact the results of this example show clearly that rosin, tung oil and tung acids in some way interreact to lose to a very substantial degree their combining power for maleic acid. In other words, these substances react by polymerization and otherwise so that conjugated double bonds are satisfied and the diene reaction with maleic acid takes place only to an incidental degree.

*Example 3.*—Equal weights of tung oil and its free fatty acids were mixed and heated to 280° C. and portions of the reaction mixture were tested for solubility in ammonia immediately after reaching 280° C. and after 10 and also 20 minutes at this temperature. None of the specimens was found to be soluble in aqueous ammonia to give a clear solution. Viscous emulsions resulted instead.

100 parts of the product which had been heated for 20 minutes at 280° C. was treated with 5 parts of maleic acid, the temperature being raised to 250° C. The maleic acid combined only to a slight extent. A portion of the product was treated with aqueous ammonia but gave a turbid emulsion. Another portion was extracted with hot water before treatment with ammonia in order to eliminate unreacted maleic acid the ammonium salts of which would tend to salt out the oil compound. A somewhat less turbid and less viscous solution was obtained in this way.

From the foregoing it is evident that heat treatment of tung oil with tung acids brings about polymerization, that is, union between the free tung acids and those forming a part of the tung oil structure (which reaction product is herein referred to as polymerized tung oil-tung acids) whereby an acid modified tung oil results and that such reaction destroys to a very large extent the ability of the tung oil or tung acid to unite with maleic anhydride in accordance with the diene synthesis.

*Example 4.*—Very much improved results are obtained when the acid-modified tung oil prepared as stated in Example 3 (without maleic acid treatment) is incorporated with rosin maleic acid. Rosin maleic acid was made by heating rosin 100 parts with maleic acid 30 parts, the temperature being carried to about 250° C. Equal parts of the rosin maleic acid and of the acid-modified tung oil referred to in the previous illustration were heated gently together for the purpose of mixing and a 40 per cent solution was made in aqueous ammonia. Instead of a turbid emulsion the composition this time was a clear fluid solution from which practically all soapiness had disappeared. The rosin maleic acid thus serves as a reducer of viscosity and acts as an eliminator of soapiness.

*Example 5.*—An acid-modified tung oil was made by heating equal parts by weight of tung oil and tung acids at 260° C. for 20 minutes. A mixture was made of 30 parts of this acid-modified tung oil with 20 parts rosin maleic acid (30 per cent maleic acid based on the rosin) and this mixture was dissolved in aqueous ammonia to make a 40 per cent solution which was clear and relatively fluid.

*Example 6.*—A similar mixture of 30 parts of the rosin maleic acid and acid-modified tung oil as used in Example 5 was heated to 220° C. with 0.05 parts cobalt acetate. This coating composition likewise formed a clear solution in ammonia water.

*Example 7.*—60 parts tung oil and 40 parts tung acids were heated at 260° C. for 20 minutes. 30 parts of this acid-modified tung oil and 20 parts of rosin maleic acid gave a clear solution in ammonia water.

*Example 8.*—Cobalt acetate was similarly incorporated in the composition of Example 7 and the product when dissolved in dilute aqueous ammonia, that is ammonia water, gave a clear solution.

The rosin maleic acid also has a very helpful effect on the brushable qualities of the compositions, greatly improving the brushability of these modified tung oil products.

*Example 9.*—50 parts each of tung acids and rosin were heated together at 280° C. for 10 minutes, yielding a clear, viscous oily product which was treated with aqueous ammonia forming a turbid emulsion-like solution. This showed a tendency to be soapy. 50 parts of the rosin tung acid complex were heated with 7.5 parts maleic acid, the latter combining readily and the maleinated product was found to dissolve in aqueous ammonia to give a clear solution of a very satisfactory fluid character. A film from the solution of 40 per cent concentration dried overnight to give a glossy coating.

In order to reduce viscosity, eliminate turbidity and soapiness and improve brushability I also may use oxidized rosin either by itself or in admixture with rosin maleic acid for the purpose. The oxidized rosin preferably is made by pulverizing rosin and exposing it to gentle heat in a current of air at a temperature below the sintering point until after several days the rosin has become readily soluble in ammonia without forming a soapy, curdy solution when prepared in concentrated form using aqueous ammonia as the medium. Oxidized rosin of this character may be used as follows:

*Example 10.*—Acid-modified tung oil was made by heating equal parts tung oil and tung acids until polymerization had taken place. 30 parts of this inter-polymerized product and 20 parts oxidized rosin were mixed and made up to a solution of 40 per cent strength in aqueous ammonia. The solution was very clear in appearance and of relatively low viscosity.

*Example 11.*—Similarly a 40 per cent solution was made using the same proportions of oxidized rosin and the acid-modified tung oil, the latter however being made from 2 parts tung acids to 3 parts tung oil. The solution in ammonia water was clear and slightly more viscous than that of Example 10.

As stated, oxidized rosin may also be used with rosin maleic acid in the foregoing compositions, for example, a mixture of equal parts of the oxidized rosin and the rosin maleic acid or 3:1 to 1:3, and the like, may be utilized as desired.

*Example 12.*—Acid-modified tung oil made with equal parts tung oil and tung acids 30 parts, oxidized rosin 20 parts, litharge 0.2 part and cobalt acetate 0.02 part were heated together at 200° C. The temperature was taken to 220° C. and the batch allowed to cool. At about 120° C. 50 parts water were added thereby cooling the mixture to about 80° C. and leaving the product in a sufficiently plastic condition to react readily with aqueous ammonia. Enough concentrated ammonia was added to provide a clear solution and then more water was introduced, the final solution being of 40 per cent strength. This yielded a varnish which was tested in various ways, for example, by applying to sheets of steel, the coating giving when dry a smooth film. In another case the varnish was diluted with water to make a 25 per cent solution and to this was added lithopone in the proportion of 5 parts to 1 part of binder. A paint of high brushability was secured which had very good covering power.

A comparison of the rates of drying of compositions in which oxidized rosin is the regulator of brushability showed the rate of drying to be slower than when rosin maleic compounds are employed.

While the invention as described above has been largely illustrated by reference to maleic acid diene synthesized products, it should be understood that there are a wide range of compounds available. Thus as illustrative of diene condensation products, there may be mentioned more specifically: tung oil-maleic acid, tung oil-fumaric acid, tung oil-malic acid condensation product, tung oil-citric acid condensation product, tung oil-citraconic acid, tung oil acids-maleic acid, blown tung oil-maleic acid, tung oil-crotonic acid, tung oil-itaconic, boiled tung oil-maleic acid, rosin maleic acid, rosin tung oil maleic acid, rosin tung oil acids, maleic acid, abietic acid-maleic acid, and the like.

Among the features of disclosure which appear paramount in the present invention are first that tung oil and tung acids which in natural state are very easily reacted by the diene reaction with reagents such as maleic acid or anhydride, lose that power in proportion to the degree of heat treatment to which they are subjected, it being possible in this manner to polymerize tung oil by itself or tung oil admixed with tung acids to destroy completely reactivity with maleic acid. On the other hand by regulating the degree of polymerization products may be obtained which are reactive with maleic acid in some degree. Since maleic acid is relatively costly I desire to use the minimum amount thereof consistent with appropriate solubility in ammonia water, and the like, and therefore may interpolymerize tung oil and tung acids to a predetermined degree at which point sufficient reactivity with a maleic acid remains to obtain a water-soluble coating composition without the employment of an undue proportion of maleic acid.

It should be noted that I have utilized mixtures of tung oil and tung acid in the preparation of various resinous bodies and have brought these materials to polymerizing temperatures in the course of preparation of these resinous complexes.

In addition to tung oil and tung acids which have been used herein in an illustrative way, I may, of course, employ the other drying and semi-drying oils and their free fatty acids having an appropriate degree of reactivity for the purpose, including various mixed polymers such as those which may be obtained from corn oil, soya bean oil and also from castor oil which has been partially distilled to create a condition of high unsaturation.

To the coating compositions which may be made from the foregoing either by the use of ammonia water or in some cases hydrocarbon solvents or other organic solvent vehicles, I may incorporate pigments, dyes, stains, and the like, including lithopone, titanium oxide, aluminum bronze, and for special instances wood flour may be added which gives an "oatmeal" finish. Zinc oxide and red lead although sometimes prone to liver may be used in some cases. The coatings may be applied to wood, plaster, cement, steel, copper, brass, aluminum and other metals and various other surfaces and materials of construction and of use in the arts and crafts.

Coatings may be air dried or may be baked. The baked coating is especially desirable for metal articles.

A single coat may be used in some cases and in fact I seek to use a highly concentrated pigment in making compositions for painting cement and particularly plastered walls in order that a good finish may be obtained with one coat. Preferably, also, the composition employed for the purpose is of fairly high viscosity in order that it may be applied to the plastered surface without the necessity of first priming or sizing same. Moreover by being of a thickish consistency it may be stippled, if desired.

However, two or more coats, that is a plurality of coats, may be applied if desired with a priming coat and upper coats of a dissimilar character, including for example a priming coat of one material and an upper coat or coats of lacquer, as for example nitrocellulose lacquer or one made with the aid of cellulose acetate or cellulose propionate, cellulose ether, and the like.

Rosin maleic acid has the ability to react with ammonium carbonate when water is introduced to give a clear solution and I therefore may utilize this property in various dry compositions in which rosin maleic acid is a prominent constituent to provide a dry powder which on addition of water will dissolve creating a paint, varnish, lacquer, enamel or other liquid coating composition.

As pointed out in prior application 581,077, identified above, the rosin-maleic type of combination particularly emphasized herein is illustrative of a class of diene reaction products in which natural resins may be utilized for reaction with unsaturated organic acids reactive therewith to produce the diene type reaction products. Among the natural resins, rosin is perhaps the most readily available for the diene synthesis, yielding acids of a special degree of solubility. The diene reagent which desirably comprises an unsaturated acid or acids generally is one having less than 12 carbon atoms, normally from 3 to 10 carbon atoms when of the aliphatic series, although they may have a larger number of carbon atoms when of the aromatic or cyclic series. Usually and preferably they are crystallizable. Such initial unsaturated aliphatic acids preferably are polybasic, normally being dibasic or tribasic including maleic, fumaric, itaconic, and citraconic acids, and so forth. An extreme degree of unsaturation is represented by the more unstable acetylene-dicarboxylic acids.

What I claim is:

1. An ammonia-soluble composition comprising unsaturated organic acid reaction product with tung oil and unsaturated organic acid reaction product with rosin.

2. A composition as in claim 1 in which an acid of a drying oil is the essential modifying agent for producing the acid-modified component.

3. A composition as in claim 1 in which tung acids constitute the essential modifying agent for producing the acid-modified component.

4. A composition containing an unsaturated organic acid reaction product with a tung compound selected from the group consisting of tung acids and tung oil capable of dissolving in or emulsifying with aqueous alkaline solutions to form a composition of relatively high viscosity and a viscosity reducer therefor selected from the group consisting of oxidized rosin and a natural resin derivative of an organic acid compound containing the group —CO—CH=CH— reactive with said natural resin.

5. A composition containing the diene reaction product of a compound containing drying oil acid radicals with an organic compound containing the group —CO—CH=CH— reactive therewith, and a natural resin compound selected from the group consisting of oxidized rosin and a natural resin derivative of an organic compound containing the group —CO—CH=CH— reactive with said natural resin serving in aqueous alkaline solutions of the first named derivative to reduce the viscosity of said solution.

6. A composition containing the diene reaction product of a compound containing drying oil acid radicals with an organic compound containing the group —CO—CH=CH— reactive therewith, and a natural resin derivative of an organic compound containing the group —CO—CH=CH— reactive with said natural resin.

7. A composition containing rosin reaction product with maleic acid and maleic acid reaction product with a component selected from the group consisting of tung oil, tung oil acids, and polymerized tung oil-tung acids.

8. An ammoniacal aqueous solution containing rosin reaction product with maleic acid and maleic acid reaction product with a component selected from the group consisting of tung oil, tung oil acids, and polymerized tung oil-tung acids.

9. A composition containing polymerized tung oil-tung acids and rosin reaction product with maleic acid.

10. A composition containing rosin reaction product with maleic acid, maleic acid reaction product with a component selected from the group consisting of tung oil, tung oil acids, and polymerized tung oil-tung acids, and polymerized tung oil-tung acids.

11. An ammonia-soluble composition comprising unsaturated organic acid reaction product with tung oil and acid-modified rosin, and a polybasic acid-polyhydric alcohol resin of high acid number.

12. A composition containing a maleic acid modified reaction product of tung oil, tung oil acids, and rosin.

13. A composition containing the reaction product of the combination of tung oil, tung oil acids and rosin, with an organic compound containing the group —CO—CH=CH— reactive therewith.

14. A composition containing polymerized tung oil-tung acids and oxidized rosin.

15. A composition containing maleic acid reaction product with a component selected from the group consisting of tung oil, tung oil acids, and polymerized tung oil-tung acids and oxidized rosin.

16. A composition of rosin reaction product with maleic acid and ammonium carbonate, soluble in water to give a solution useful as a coating composition.

17. An ammonia-soluble composition comprising unsaturated organic acid reaction product with tung oil and oxidized rosin.

18. An ammoniacal aqueous solution containing an unsaturated organic acid reaction product with tung oil and an acid-modified rosin.

19. A composition containing the diene reaction product of a compound containing unsaturated oil acid radicals with an organic compound containing the group —CO—CH=CH— reactive therewith, and a natural resin compound selected from the group consisting of oxidized rosin and a natural resin derivative of an organic compound containing the group —CO—CH=CH— reactive with said natural resin serving in aqueous alkaline solution for the first-named derivative to reduce the viscosity of said solution.

CARLETON ELLIS.